US006941304B2

(12) United States Patent
Gainey et al.

(10) Patent No.: US 6,941,304 B2
(45) Date of Patent: Sep. 6, 2005

(54) METHOD AND APPARATUS FOR PERFORMING ENTERPRISE EMAIL MANAGEMENT

(75) Inventors: Mark Gainey, Los Altos, CA (US); Alex Broquet, Felton, CA (US); Michael Horvath, Madison, WI (US)

(73) Assignee: Kana Software, Inc., Menlo Park, CA (US)

( * ) Notice: Subject to any disclaimer, the term of this patent is extended or adjusted under 35 U.S.C. 154(b) by 0 days.

(21) Appl. No.: 09/193,833

(22) Filed: Nov. 17, 1998

(65) Prior Publication Data

US 2002/0099681 A1 Jul. 25, 2002

(51) Int. Cl.[7] .............................................. G06F 17/30
(52) U.S. Cl. .............................. 707/10; 707/7; 709/206
(58) Field of Search .............................. 707/1–10, 104; 709/206–207, 219

(56) References Cited

U.S. PATENT DOCUMENTS

| 5,548,753 | A | * | 8/1996 | Linstead et al. ................ 707/1 |
| 5,628,004 | A | * | 5/1997 | Gormley et al. ............ 707/104 |
| 5,661,516 | A | * | 8/1997 | Carles ......................... 725/146 |
| 5,765,033 | A | | 6/1998 | Miloslavsky ........... 395/200.36 |
| 5,806,057 | A | * | 9/1998 | Gormley et al. ................ 707/1 |
| 5,819,269 | A | * | 10/1998 | Uomini .......................... 707/1 |
| 5,862,325 | A | * | 1/1999 | Reed et al. ................... 707/201 |
| 5,892,909 | A | * | 4/1999 | Grasso et al. ................ 709/200 |
| 6,122,632 | A | * | 9/2000 | Botts et al. .................... 707/10 |
| 6,131,098 | A | * | 10/2000 | Zellweger .................... 707/102 |
| 6,163,802 | A | * | 12/2000 | Lin et al. ..................... 709/200 |
| 6,182,059 | B1 | * | 1/2001 | Angotti et al. ................. 706/45 |
| 6,182,118 | B1 | * | 1/2001 | Finney et al. ................ 709/206 |
| 6,226,630 | B1 | * | 5/2001 | Billmers .......................... 707/3 |
| 6,226,670 | B1 | * | 5/2001 | Ueno et al. ................. 340/10.1 |
| 6,249,807 | B1 | * | 6/2001 | Shaw et al. .................. 379/256 |
| 6,298,343 | B1 | * | 10/2001 | Chang et al. ................... 707/4 |
| 6,324,538 | B1 | * | 11/2001 | Wesinger, Jr. et al. ........ 707/10 |

FOREIGN PATENT DOCUMENTS

| WO | WO0029988 | * | 5/2000 |

OTHER PUBLICATIONS

Cohen, William, Learning Rules that Classify E–Mail.*
Payne et al, Interface Agents that Learn: An investigation of Learning Issues in a Mail Agent interface, Applied Artifical Intelligence, 1997, pp. 1–32.*

* cited by examiner

Primary Examiner—Greta Robinson
Assistant Examiner—Debbie M. Le
(74) Attorney, Agent, or Firm—Fenwick & West LLP

(57) ABSTRACT

The enterprise email system processes incoming email using a set of configurable rules that examine each message for a specific attribute state condition and invoke a configurable action when the attribute satisfies the condition. A number of actions may be invoked such as routing a message to a specific mail queue. The enterprise email system assigns a mail queue timer when a message is moved into a mail queue. Each mail queue has a different mail queue timeout value that specifies the maximum amount of time that a message may sit idle within a mail queue. The enterprise email system may automatically move a message from a mail queue into a mailbox of an enterprise email system user that subscribed to the mail queue. A mailbox timer then set for the message and the mailbox timer is compared with a mailbox timeout value that specifies the amount of time that message may sit idle within a mail queue.

15 Claims, 11 Drawing Sheets

| Attributes | | |
|---|---|---|
| Attributes | Condition | Value |
| | contains ▼ | |
| subject ▼ | contains ▼ | redirect |

New

| Actions | |
|---|---|
| Action | Value |
| redirect ▼ | aaa@aaa.com |

New

OK  Cancel  Help

METHOD AND APPARATUS FOR PERFORMING ENTERPRISE EMAIL MANAGEMENT

CROSS-REFERENCE TO RELATED APPLICATION

This application is related to U.S. Pat. Nos. 6,249,807 and 6,282,565, both filed Nov. 17, 1998 and assigned to the same Assignee as this application.

FIELD OF THE INVENTION

The present invention relates to the field of computer email communication. In particular the present invention discloses an enterprise email management system that streamlines the handling of large volumes of incoming email messages.

BACKGROUND OF THE INVENTION

Large corporations typically maintain telecommunication calling centers that contain a large number of customer service representatives. Each customer service representative is seated at telephone workstation that usually includes a telephone and a computer system for accessing customer information. The customer service representatives respond to calls from customers regarding new orders, product support, and other customer questions.

Internet email has evolved into a new standard communication medium in the late $20^{th}$ century. More and more customers are now using email messages to communicate questions, complaints, and requests to the corporations that the customers purchase products and services from. Therefore, the volume of incoming email from customers has increased dramatically at many corporations. In order to handle the large volume of incoming email messages, it would be desirable to have a set of software tools that simplify the task of responding to large volumes of email from customers.

SUMMARY OF THE INVENTION

An enterprise email management system is disclosed. The enterprise mail system is designed to quickly and efficiently handle large volumes of email that is responded to by enterprise email system users. The enterprise email system processes incoming email using a set of configurable rules that examine each message for a specific attribute state condition and invoke a configurable action when the attribute satisfies the condition. A number of actions may be invoked such as mailing list additions/deletions, routing to specific mail queue, routing to a specific enterprise mail system user, forwarding to an outside user, categorizing the message, and removing the message.

Once a message has been placed into a mail queue, a set of timers ensure that the message is handled in a timely manner. The enterprise email system assigns a mail queue timer when a message is moved into a mail queue. Each mail queue has a different mail queue timeout value that specifies the maximum amount of time that message may sit idle within a mail queue. The enterprise email system may automatically move a message from a mail queue into a mailbox of an enterprise email system user that subscribed to the mail queue. When the enterprise email system moves a message into the mailbox of an enterprise email system user, the enterprise email system assigns a mailbox timer to the message. The mailbox timer is compared with a mailbox timeout value that specifies the amount of time that message may sit idle within a mailbox. If the mailbox timer expires, the message is returned to the mail queue from where the message came. If the mail queue timer expires, then the message is routed to another mail queue or enterprise email user. Furthermore, additional actions may be invoked if the mail queue timer expires.

Enterprise email system users subscribe to variable mail queues. When an enterprise email system user logs into the system, the enterprise email system delivers a set of messages from the mail queues that the user subscribes to into the enterprise email system user's mailbox. The user responds to the messages. To aid the user, the enterprise email system may create a template response message including a proposed message body, a set of attachments, and a set of recipients that should receive a copy of the response message.

Other objects, features, and advantages of the present invention will be apparently from the accompanying drawings and from the following detailed description.

BRIEF DESCRIPTION OF THE DRAWINGS

The objects, features and advantages of the present invention will be apparent to one skilled in the art, in view of the following detailed description in which:

FIG. 2A illustrates a screen display of a graphical user interface for entering a mail receiver rule.

DETAILED DESCRIPTION OF THE PREFERRED EMBODIMENT

A method and apparatus for handling enterprise email is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the SMTP mail protocol and an SQL database. However, the same techniques can easily be applied to other types of mail protocols and other types of databases.

An Enterprise Email Management System

Figure 1:
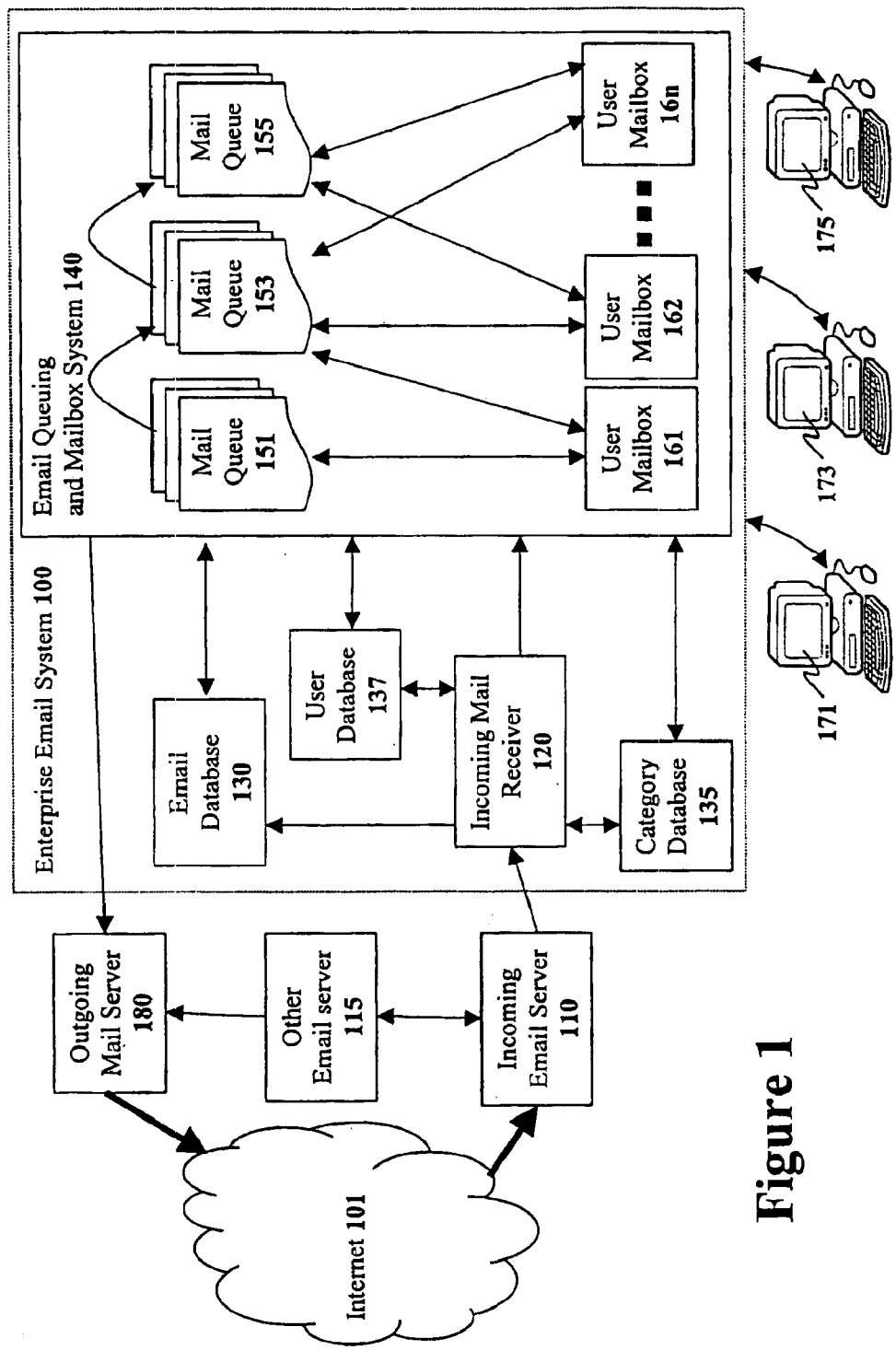
FIG. 1 illustrates an overall block diagram of an enterprise email management system built according to the teachings of the present invention.

FIG. 1 illustrates an overall block diagram of one embodiment of an enterprise mail system constructed using the teachings of the present invention. Referring to FIG. 1, the enterprise mail system receives incoming email from the Internet 101 into an incoming email server 110. The incoming email server 110 may be any type of email server that is capable of receiving incoming mail and routing the received email. In a preferred embodiment, the incoming email server 110 is a Simple Mail Transport Protocol (SMTP) based email server such as the common UNIX Sendmail program.

The incoming email server 110 examines the headers of the incoming email to determine where the incoming email should be routed. In some environments, both enterprise email and private email will be received. The incoming email server 110 can be configured to deliver private email to an email server 115 that will not be processed by the enterprise email system 100 of the present invention. All email that is to be processed by the enterprise email system 100 is routed to an incoming email receiver 120. For example, all email directed to standard customer support email addresses such as help@company.com, support@company.com, and info@company.com can be handled by the enterprise email management system 100.

In an alternate embodiment, all the email directed toward an organization is sent directly to the incoming email receiver 120 from the Internet 101. In such an embodiment, the incoming email receiver 120 can be configured to send email that does not need to be handled by the enterprise email system 100 to another mail system using a "redirect" action that will be later described.

Sorting Incoming Enterprise Email

The incoming email receiver 120 may receive email directly as illustrated in FIG. 1. In an alternate embodiment, the incoming email receiver 120 may fetch email from a Post Office Protocol (POP) email server. For an embodiment with an incoming email receiver 120 that fetches email from a POP server, a configurable parameter may determine how often the incoming email receiver 120 checks the POP server for new email messages. Typically, the incoming email receiver 120 is set to check for new email every one to five minutes.

The incoming email receiver 120 examines each incoming email message by performing a number of tests. The initial tests determine if the incoming email message should be handled by the enterprise email system 100 and how the message will be handled.

First, the incoming email receiver 120 performs a junk email test that filters out any unsolicited commercial email (sometimes referred to as "Spam") that does not need to be responded to. Such junk email is simply discarded in order not to waste resources.

After filtering out email messages that do not need to be processed, the incoming email receiver 120 may send out an acknowledgement to the sender to inform the sender of an email message that the email message was received and will be responded to. In one embodiment, the incoming email receiver 120 may first examine an email database 130 to see if the user has previously sent any other email in a configurable time period. In one embodiment, the email database 130 is an SQL database that is accessible by many users simultaneously. For example, the Oracle7 database from Oracle Corporation of Redwood Shores, Calif. may be used to stores messages. When the same user has sent multiple messages within a predetermined time period, the incoming email receiver 120 may elect not to send acknowledgements for the later messages.

Another task performed by the incoming email receiver 120 is a search in the email database to see if the same sender has sent any other messages within a configurable time period. If the same sender has send more than one message within the defined time period, those messages may be linked together in the message database 130. The linked email messages will be handled together by a single enterprise mail system user. In this manner, if a sender sends in a first message asking a question and shortly thereafter sends another message saying that he found the answer to the question, a customer support person may decide to ignore the question in the original email message.

Once an email message has passed the initial screening, the incoming email receiver 120 then creates a new entry in the email database 130 for the incoming email message. The newly created incoming email entry in the email database 130 stores the received message plus other information that will be associated with the message. For example, the email database 130 will store a response email message created to respond to the incoming email message.

The incoming email receiver 120 may limit the size of incoming email messages. Specifically, the maximum number of bytes for the body of an email message, not including attachments, is limited to a configured parameter. If the body of an incoming email message exceeds this maximum size number, the incoming email message is truncated. By truncating messages, the incoming email receiver 120 conserves storage space in the email database 130.

The incoming email receiver 120 may also strip incoming attachments from incoming email messages. The incoming email receiver 120 may place the attachments from incoming email messages into a specified directory within the file system separate from the database.

After placing an incoming email message in the email database 130, the incoming email receiver 120 runs the incoming email message through a set of configurable mail receiver rules that determine how the message will be processed. Each mail receiver rule defines an attribute that is examined, a pattern to be matched or value to be compared, and an action to be performed. The mail receiver rules allow incoming email messages to be handled automatically in a variety of manners including routing the email message to a particular user or message queue, discarding the email message, or forwarding the email message.

The rule processor of the present invention runs all incoming email messages through all the mail receiver rules on a first pass, checks all the criteria, and accesses all the actions of the satisfied rules. If the attributes of a message satisfy two mail receiver rules having contradictory actions, usually the first mail receiver rule takes precedence. Some mail receiver rules, however, can specify actions that have higher priority than other actions. For example, two mail receiver rule actions that take precedence include "Route to the same sender as before" and "Drop message".

The basic mail receiver rule format used by one embodiment of the rule processor is:

Attribute.Condition(Condition Value)Action(Action Value)

Wherein Attribute defines an attribute of an incoming messages such as a particular header, Condition defines a comparison condition, Condition Value defines a value that the attribute is compared with using the comparison condition, Action defines an action that should be performed, and Action Value determines a particular parameter for the Action.

Instead of having users manually entering a list of rules as a typed string of characters, the present invention provides a graphical user interface entry system that allows mail receiver rules to be created with drop-down menus and value fields. To enter a new rule, a user simply selects an Attribute, a Condition comparison, a condition value, and an action that should occur when the attribute matches the value using the condition comparison as illustrated in FIG. 2A.

The following table sets forth one possible set of message attributes that may be examined:

| Message Attribute | Contents of the message Attribute. |
|---|---|
| subject | The subject of the message. |
| header | Any of the SMTP mail headers including "to:" field, the "from:" field, timestamps, mail server stamps, etc. |
| message body | The body of the incoming message. |
| source | The entire message source including the header and the body. |
| sender name | The name of entity that sent the incoming email message. |
| sender email address | The email address of entity that sent the incoming email message. |
| recipient name | The name of mailbox/alias that the email message was sent to. |
| recipient email address) | The email address of mailbox/alias that the email message was sent to. |

The following list describes a set of condition comparisons from one embodiment:

| Comparison Condition | Tested Attribute must . . . |
|---|---|
| contains | have the value (word or phrase). |
| caseSensitiveContains | have the value exactly as entered. |
| startsWith | start with the value. |
| caseSensitiveStartsWith | start with the value exactly as entered. |
| endsWith | end with the value. |
| caseSensitiveEndsWith | end with the value exactly as entered. |
| Equals | match the value exactly. |
| isNull | be empty. |
| isNotNull | not be empty. |
| sizeLessThan | be smaller than. |
| sizeGreaterThan | be larger than. |
| doesNotContain | not have the value. |
| caseSensitiveDoesNotContain | not have the value exactly as entered. |

The Comparison Condition are used along with the Comparison Value provided in the mail receiver rule. The Comparison Value may be a string, an integer, a floating point value, or any other data type that may be compared with a message attribute.

The following table provides one set of possible Actions that may be invoked by the mail receiver rule processor if the condition is satisfied:

| Action | Description of the Action performed. |
|---|---|
| Route | Send the email message to specified enterprise mail system user or enterprise mail system queue. |
| Categorize | Assign a category to the email message. |
| NoAnswer | No response necessary; no further action is required but keep it in the email database. |
| ForwardTrack | Forward to someone outside the enterprise email system. The enterprise email system will set a timer for the forwarded message. If no action is taken by the person outside of the enterprise email system within the time specified in the timer, then the enterprise email system will forward the message to a general message handling queue. |

-continued

| Action | Description of the Action performed. |
|---|---|
| Redirect | Send to an outside user with no tracking or notification. |
| opt-in | Add the sender to a mailing list. |
| optout | Remove the sender from a mailing list. |
| Acknowledge | Send an automatic pre-approved acknowledgment to the email message sender. |
| AutoRespond | Automatically send a pre-approved response message to the email message sender and do not place the message in a queue. |
| Drop | Do not route the incoming email message and remove the email message from the email database. |

The incoming email receiver 120 makes sure that no routing rule actions conflict with each other. The following list explains how the mail receiver rules are processed and the processing order.

Action priority is determined by the rule's order in the rule list. For example, the first mail receiver rule in the mail receiver rule list has the highest priority. Some rules, however, take priority over order.

An internal Collaborate action takes precedence over all other actions (including Drop). No other actions can be taken.

A Drop action takes precedence over all other actions except Collaborate. If a message is dropped no additional actions can be performed. (A dropped message is completely removed from the system and is not stored.)

Only one of the following workflow actions can be applied per message: Route, NoAnswer, ForwardTrack, Redirect, and Same Sender Route. The first such action encountered is performed. Same Sender Route is an internal action based on the multiple messages from the same sender options in incoming email receiver preferences.

Only one Acknowledge action can be applied per message. The first Acknowledge action encountered is performed and the subsequent acknowledge actions will be ignored.

All Categorize actions will be performed, regardless of the failure of other actions found in the rule with the Categorize action. This is important if a category is used to record the fact that an action was taken. For example, subject.contains("xyz")→NoAnswer & categorize("no-reply").

An OptOut action will be performed unless the message gets dropped. It doesn't override or restrict any other actions.

An internal Same Sender Route action takes precedence over all over workflow actions such as route and forward & track.

Categorizing Email Messages

During the mail receiver rule set processing, the incoming email receiver 120 may assign one or more categories to an email message. Note that categories may also be assigned to an email message manually by an enterprise mail system, a process described later. When an email message has been assigned to a category, additional processing may be performed on the message depending on the definition of the category.

When a category is assigned to a message, the incoming email receiver 120 refers to a category database 135. The category database 135 is conceptually similar to a Frequency Asked Questions (FAQ) file for an organization.

Specifically, each category entry in the category database 135 addresses a common problem, question, or request. For example, a software company supporting a word processing program may have category entries for "Word processor software installation", "Opening Documents", "Editing Documents", and "Printing Documents".

The category database 135 is organized in a hierarchical form wherein each category may have several subcategories. For example, the "Printing Documents" category entry may have subcategory entries for "Printing Documents using a printer coupled directly to the personal computer" and "Printing Documents using a printer coupled to a network." Each subcategory may have additional subcategories.

In FIG. 1, the category database 135 is illustrated as a separate database from email database 130. However, in an implementation, the category database 135 and the email database 130 may reside in a single database with separate tables.

The following list provides one possible set of parameters that may be used to define a category entry in the category database 135, however other parameters can easily be added:

1. Category Name—Defines a name for the category.
2. Hot Key—Provides a short-hand term for the category. The Hot Key can be used by users in order to quickly refer to the category.
3. Description—The Description provides a detailed description of what the category covers. The description allows a person manually categorizing an incoming email to determine if a particular category is appropriate for the incoming email.
4. Template Text—Defines the standard body of text that will be placed into the body of an outgoing response email message.
5. Recipients—Defines a set of people that should receive a copy of any outgoing response messages that were created using this category or a copy of the original incoming message. For example, an expert in certain categories may wish to be informed about all customer complaints, questions, and problems concerning certain categories. The recipients field defines a set of normal recipients (to:), a set of carbon copy (cc:) recipients, and a set of blind carbon copy (bcc:) recipients, as well as forward and track recipients, redirect recipients, and collaborate recipients.
6. Actions—Defines a set of actions that should automatically be performed on the incoming message upon categorization. Details on the Actions will be described later.
7. Attachments—Defines a set of attachments that should accompany any outgoing response email message. For example, all responses to incoming email messages concerning a known but solved problem may attach a file used to solve the problem such as patch code that solves a particular software problem.
8. Include original attachments—Specifies if attachments that accompany the incoming email message should be included in the outgoing response email message.
Keep thread ownership—Specifies if the same user that responds to a particular incoming email message should receive all subsequent responses. Placing an identifier in the subject or body field of the outgoing response email enables the mail receiver to identify any reply to the outgoing response email.

Figure 2B:
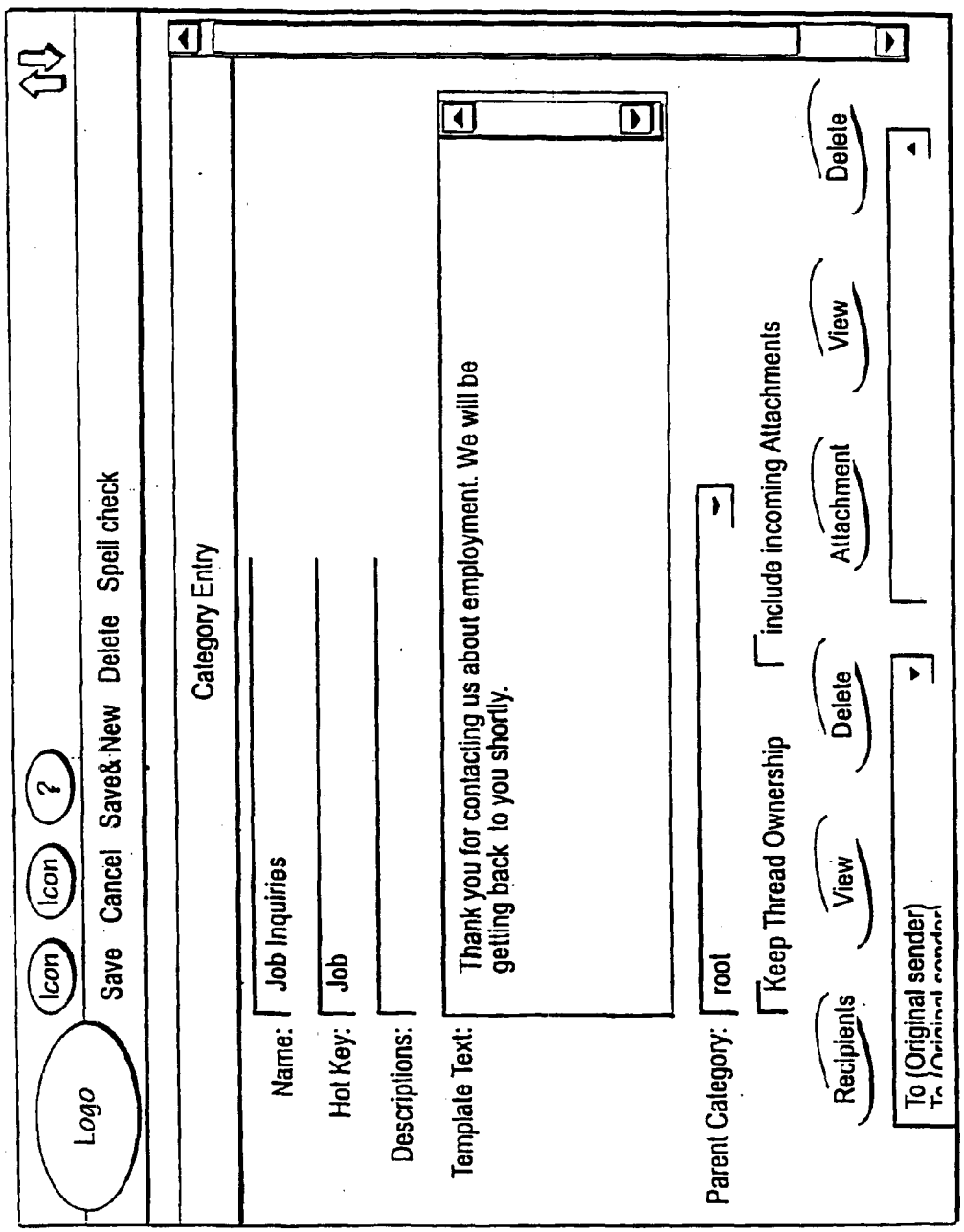
FIG. 2B illustrates a screen display of a graphical user interface for entering a category.

To create the category database 135, one embodiment of the present invention provides a graphical user interface for entering category information. FIG. 2B illustrates a screen display of a graphical user interface for entering a category into the category database 135.

As defined in the category entry previously set forth, each category entry may specify a set of recipients. The recipients are divided into recipient types as set forth in the following table:

| Recipient Type | Who the recipients are and what that recipient will receive. | Information stored in the Database |
|---|---|---|
| To: | Recipients that will receive the response message created. | Incoming message Outgoing message |
| cc: | Recipients that will receive a carbon copy (cc:) of the response message created. | Incoming message Outgoing message |
| bcc: | Recipients that will receive a carbon copy (cc:) of the response message created. | Incoming message Outgoing message |
| Redirect | A non enterprise email user that should receive the email message. Use when someone else should respond to the customer. | Incoming message Response action |
| Forward and Track | The incoming email message needs to be answered, but someone who is not using the enterprise email system must provide the content of the answer. The enterprise email system will set a timer for the forwarded message. If no action is taken by the outside person within the time specified in the timer, then the enterprise email system will route the message back to the mailbox of the user who initiated the Forward and Track. The return address on the email message forwarded to the outside person is an enterprise email system address so that a response created by the non-enterprise email responder will be received and tracked by the enterprise email system. The response email message is relayed to the sender of the original incoming email. | Incoming message Response action Message sent to the non-enterprise email responder. Reply written by the non-enterprise email responder. |
| Collaborate | The incoming email message needs to be answered but help or guidance is needed from an outside person to provide the answer. The enterprise email system will set a timer for the message sent to the outside collaborator. If no action is taken by the outside person within the time specified in the timer, then the enterprise email system will route the message back to the mailbox of the user who initiated the Forward and Track. The return address on the collaborate email message sent to the outside person is an enterprise email system address so that a response created by the outside person will be received by the enterprise email system and reviewed by an enterprise email user before it is forwarded to the sender of the original incoming email. | Incoming message Response action. Message sent to the non-enterprise email responder. Reply written by the non-enterprise email responder. |

Each category entry may also specify a set of additional actions that should be performed on the incoming email messages that are placed into the category. The actions that may be invoked are similar to the actions described with reference to the mail receiver rules. The actions in the category entry may be performed in addition to the actions defined in the mail receiver rules. However, duplicative actions will be ignored. For example, if the mail receiver 120 already specified that an acknowledgement should be sent then an acknowledgement action in a category entry will be ignored.

A typical action is to create a "skeleton" response email message that will be sent back to the sender. When an incoming email message is assigned to a particular category that specifies a "create response message" action, a "skeleton" response message is created based upon the category configuration.

After the incoming email receiver 120 has processed the mail receiver rules and processed assigned category actions, the incoming email receiver 120 is finished processing the incoming message. The entire enterprise email system 100 may be finished with the incoming email message if the incoming email receiver 120 dropped the message, no answered the message, or redirected the message to a user outside of the enterprise email system 100.

However, the incoming email receiver 120 usually uses a workflow action to place the incoming mail message into a particular message queues. For example, the route, forward and track, and collaborate workflow actions all cause the incoming email receiver 120 to pass the incoming email message to an email message queue or mailbox in the email queuing and mailbox system 140 as illustrated in FIG. 1. Furthermore, if no workflow action is invoked by the mail receiver 120, then the mail receiver will place the message into a generic message pool for messages that did not trigger a workflow action.

When the mail receiver 120 moves a message into an email queue or a mailbox, the incoming email receiver 120 places a pointer to the email message into the particular queue or mailbox. The actual email message remains in the email message database 130 and will be accessed as necessary using the pointer to the email message.

Routed messages

The route action simply moves an email message into one of the queues in the mailboxes or queues of the Email Queuing and Mailbox System 140. A message placed in a queue will be given to a user that subscribes to the queue.

Forward and Track

Messages that handled by the forward and track action are forwarded to a user that does not use the enterprise mail system (outside user). However, when the message is forwarded, the reply address is set to a special address that will cause any reply to be sent back to the enterprise email system 100. Before the message is forwarded to the outside user, the enterprise mail system sets a timer. If no response message is received before the timer expires then the message is returned to the mail box of the enterprise email system user who initiated the Forward and Track.

If a response is received, the enterprise email system will store the response email message sent by the outside user into the email database 130. The response email message is then forwarded along to the sender of the original incoming message. The reply address of the response message sent to the sender of the original incoming message will also be set to a special address for the enterprise email system 100 such that any subsequent reply messages from the original message sender will again be handled by the enterprise email system 100.

Collaborate

Messages that are handled by the Collaborate action are forwarded to a user who does not use the enterprise mail system. The enterprise email system sets a timer for the message is forwarded to the outside user. Furthermore, when the message is forwarded, the reply address is set to a special address that will cause any reply to be sent back to the enterprise email system 100. If no response is received from the outside user before the timer expires, then the message is returned to the mailbox of the enterprise mail user that initiated the collaborate action.

If a response is received from the outside user before the timer expires, the enterprise email system will store the response email message created by the outside user into the email database 130. The original message is then placed back into one of the message queues such that the enterprise mail system user that initiated the collaboration can review the outside user's response before it is sent to the original incoming message sender. In this manner, the response message created by an outsider can be examined before the response email message is sent to the sender of the original incoming message.

Referring back to FIG. 1, the queues in the Email Queuing and Mailbox System 140 are organized in a manner that helps the enterprise best respond to the messages. For example, queues may be organized to handle different categories of incoming messages. Thus, similar categories of messages can be grouped in the same message queue. The details of the queuing system will be described in a later section. Messages may also be placed directly into a particular user's mailbox. For example, if a certain mail user was supposed to receive all responses to a particular outgoing message, such associate response will be placed directly into that mail user's mailbox.

Each message queue is defined by a set of configurable parameters. The following table defines a set of parameters that can be used to describe a queue in one embodiment:

| Queue Parameter | Parameter function |
| --- | --- |
| Name | Descriptive name for the queue. |
| Description | Detailed description of the use of the queue. |
| Maximum Timeout | The maximum period of time that a message may remain in the queue before timing out. |
| Reroute To: | The queue or mailbox that messages should be routed to if the queue timer value expires. |
| Timeout Actions: | A set of actions that should be performed if the queue timer value expires. |
| Assigned Users | A list of enterprise mail system users assigned to the mail queue. |

Figure 3:
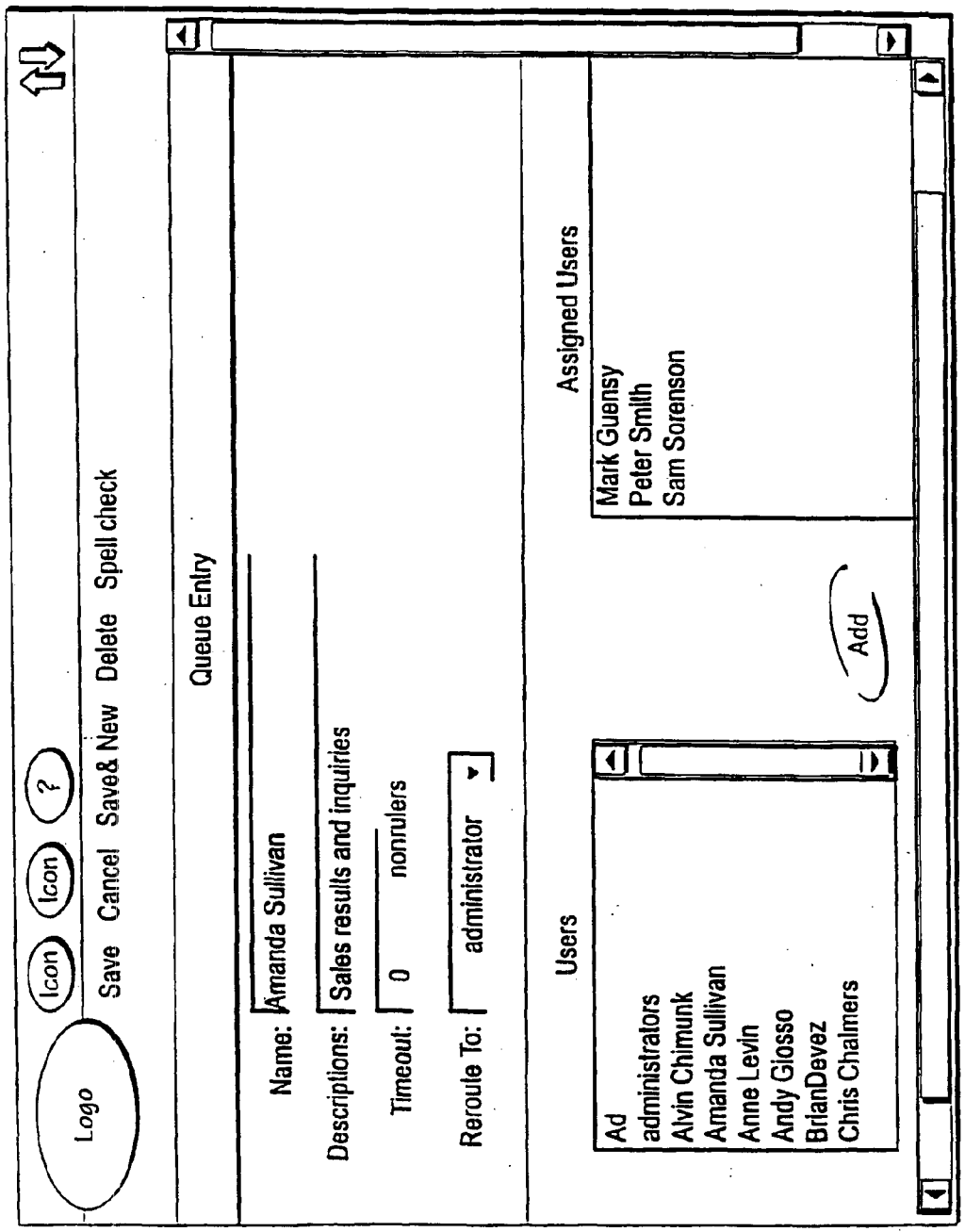
FIG. 3 illustrates a graphical user interface for configuring the email message queue parameters.

As for most configurable parameters, a graphical interface is provided for entering and modifying the parameters in a preferred embodiment. FIG. 3 illustrates a graphical user interface for configuring the queue parameters. Note that a list of available users is display such that users can easily be assigned a subscription to the queue.

In one embodiment, the email queuing and mailbox system 140 includes multiple mail queues. The mail queues maybe separated based on varying subject matters (e.g., customer support, request for product/service literature, general comments) or any other system of mail queue organization. If the mail queues are organized into subject matter, then the mail receiver rule of the incoming email receiver 120 can be used to examine and categorize new messages. The incoming email receiver 120 may then route the categorized messages to queues which corresponds to the subject matter of the respective messages.

In one embodiment, one or more users mail boxes of the email queuing and mailbox system 140 may subscribe to a particular queue (151, 153, or 155). When that user logs into the enterprise email system 100, the email queuing and mailbox system 140 routes messages to the user's queue based upon the user's mail queue subscriptions. For example, all the customer support personnel of a company may subscribe to a queue that receives messages relating to customer support matters. When each customer support representative logs in, the email queuing and mailbox system 140 will deliver a set of customer support messages to that users.

In addition, the queues may be linked to other queues. In one embodiment, a priority system may be implemented by linking together queues wherein each queue may specify a configurable amount of time that may elapse before an "action" (e.g., a response to the message) needs to occur for a message stored within a queue. In one embodiment, the predetermined amount of time that a message may be held in a queue before "action" occurs is hereinafter referred to as a "queue timer."

Once a message's queue timer expires, a predetermined action is performed by the email queuing and mailbox system 140. In one embodiment, the email message may be routed to another specified queue or user mailbox. The second queue may have a higher priority by indicating a shorter time out period allotted to messages place in the new queue. Other actions may also be specified. For example, in one embodiment, the email queuing and mailbox system 140 may generate an alert message that will be sent to a particular user's mail box. The alert message may indicate that action is required for the respective message which has not yet been handled by any enterprise email user.

Figure 4:
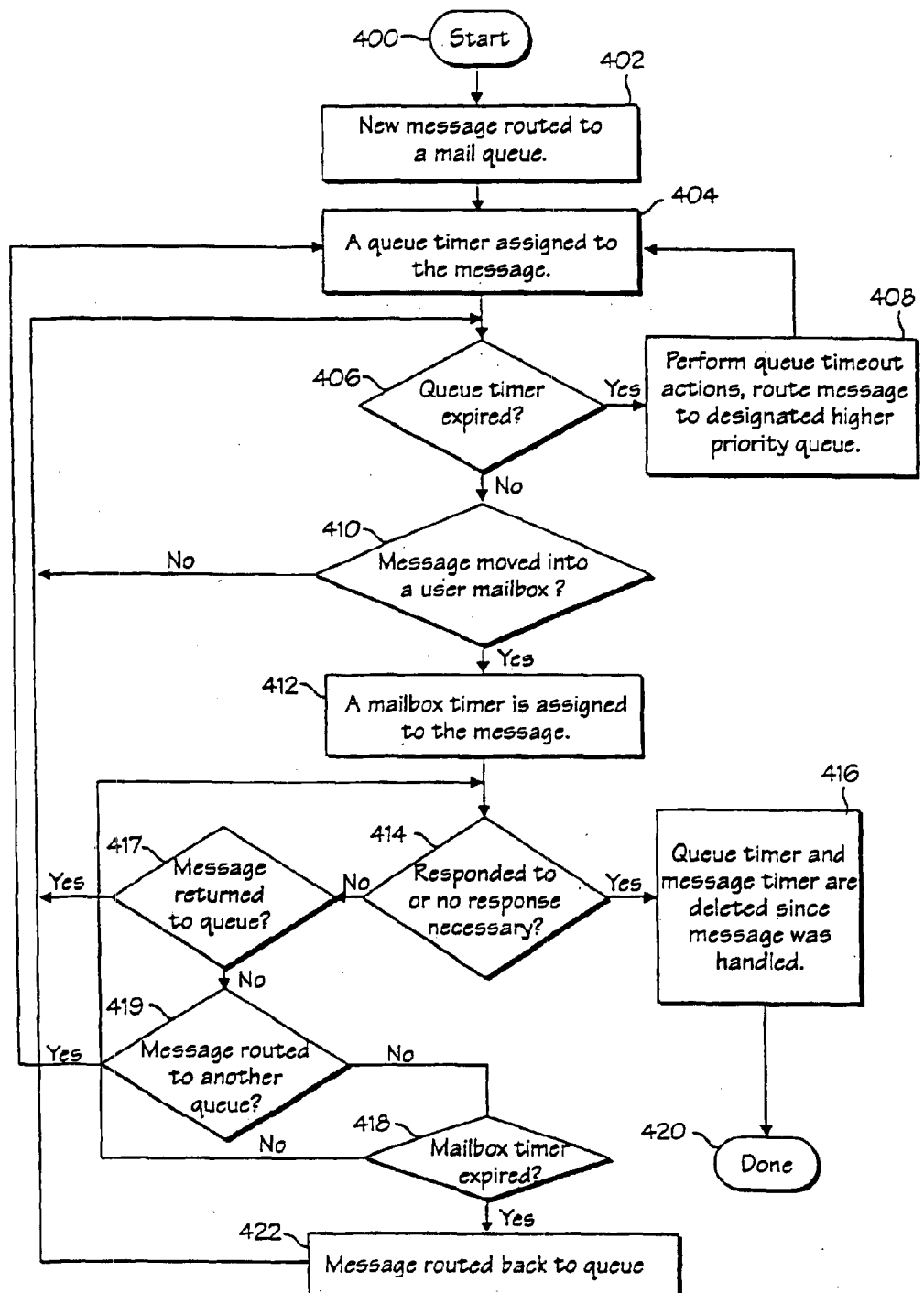
FIG. 4 illustrates a flow diagram describing a set of steps for routing messages among the queues and user mailboxes within the Email Queuing and Mailbox System.

FIG. 4 illustrates a flow diagram that describes one embodiment of steps for routing messages among the queues and user mailboxes of the email queuing and mailbox system 140 of the enterprise email system 100. In step 402, a new message is routed to one of the mail queues based on a predetermined criterion. The messages are initially routed into a queue based on the mail receiver rules. The criterion for initially selecting an email message queue, however, may vary within the scope of the invention. Messages may subsequently be routed into different message queues depending on message categorization or direct routing commands from users of the enterprise email system 100.

In step 404, the email queuing and mailbox system 140 sets a queue timer for the new message. The queue timer defines a predetermined amount of time that the email message mail stay in the queue without having the message expires. The queue timer for the new message immediately begins.

At step 406, the queue timer is checked to see if the queue timer for the message has expired. If the queue timer has timed out, then the email queuing and mailbox system 140 proceeds to step 408.

At step 408, the Timeout Actions defined in the queue definition are performed. Furthermore, the message is moved to a new message queue as defined by the queue's "route to" parameter. If the email message is routed to another queue, then the method proceeds to step 404 where a new queue timer is assigned to the message for the message.

Referring back to step 406, if the queue timer has not timed out, then the email queuing and mailbox system 140 proceeds to step 410. At step 410, the email queuing and mailbox system 140 determines if the message has been moved into a user's mail box. If the message has not been moved into a user's mailbox, then the method proceeds back to step 406 to check for a queue timeout. Otherwise, the method proceeds to step 412.

At step 412, the message has been moved into one of the user mailboxes. In one embodiment, as previously discussed, one or more users may subscribe to a queue such that messages from those queues are placed into their mailboxes. In addition, a user may also manually move a message from a queue without subscribing to the queue. Referring to step 412, once a message has been moved into a user mailbox, the email queuing and mailbox system 140 creates a separate second timer for the message. The second timer is a mailbox timer that specifies how long the message has been in the user's mailbox. The mailbox timer immediately begins to lapse. Note that mailbox timer is separate from the queue timer. Moreover, in one embodiment, the queue timer and the user mailbox timer both continue to lapse simultaneously.

In step 414, the email queuing and mailbox system 140 determines if the message has been acted upon. The action to stop a timer may vary within the scope of the invention. In one embodiment, the actions required to stop a message timer for a message within a user mailbox can include generating a response to the message, marking the message as requiring no response, releasing the message back to the queue from which it came, or routing the message to a different mail queue. If the message within a user mailbox was responded to or no response is necessary, the method proceeds to step 416. If a response as generated or the message required no response, the mail queuing and mailbox system 140 deletes the queue timer and the mailbox timer for the message and the method proceeds to step 420, where additional actions on the message are not necessary from the perspective of the enterprise email system 100. In step 417, if the message was released back to the mail queue from which it came the mailbox timer is deleted and the method proceeds to step 406. Finally, if the message was routed to a different mail queue as stated in step 419, then both the queue timer and mailbox timer are deleted and the method proceeds back to step 414.

Referring back to step 414, if the message has not been acted upon then the method proceeds to step 418 where the email queuing and mailbox system 140 determines if the mailbox timer for the message has expired. If the mailbox timer has not expired, the message continues to reside in the respective user mailbox and the method proceeds back to step 414.

Conversely, if the mailbox timer has expired in step 418 then the method proceeds to step 422. In step 422, the email queuing and mailbox system 140 removes the message from the user's mailbox and returns the email message back to the queue from which the email message was obtained.

The method then proceeds back to step 406 where the email queuing and mailbox system 140 determines if the queue timer has yet expired. If the queue timer has not expired, the message continues to reside in the respective queue until the message is moved into a user mailbox or the queue timer expires. If the queue timer for the message has expired then the method proceed to step 408 where the message is routed to a separate queue and the queue timeout actions are invoked.

User Message Reading and Responding

A number of enterprise email system users process the email moved into the Email Queuing and Mailbox System 140. Each enterprise mail system user has an account with the enterprise email system 100. The enterprise mail system users are listed in the mail user database 137.

The following list defines a set of parameters that define an enterprise mail system user account:

| User Account Parameter | Parameter use |
|---|---|
| Name | The user's full name. |
| Password | The password used to access the user account. |
| Description | The title of the user such as "Customer Service Representative"or Sales Person" |
| Admin Function level | A standard operator level allows the user to perform functions to respond to messages. An administrative level allows the user to configure parameters that control the enterprise email system. |
| Vacation Mode | Specifies if the user is on vacation, and if so which queue or mailbox should be used to handle this users email if the user is on vacation. |
| Queues | Defines a set of queues that the user is assigned to. |

Figure 5:
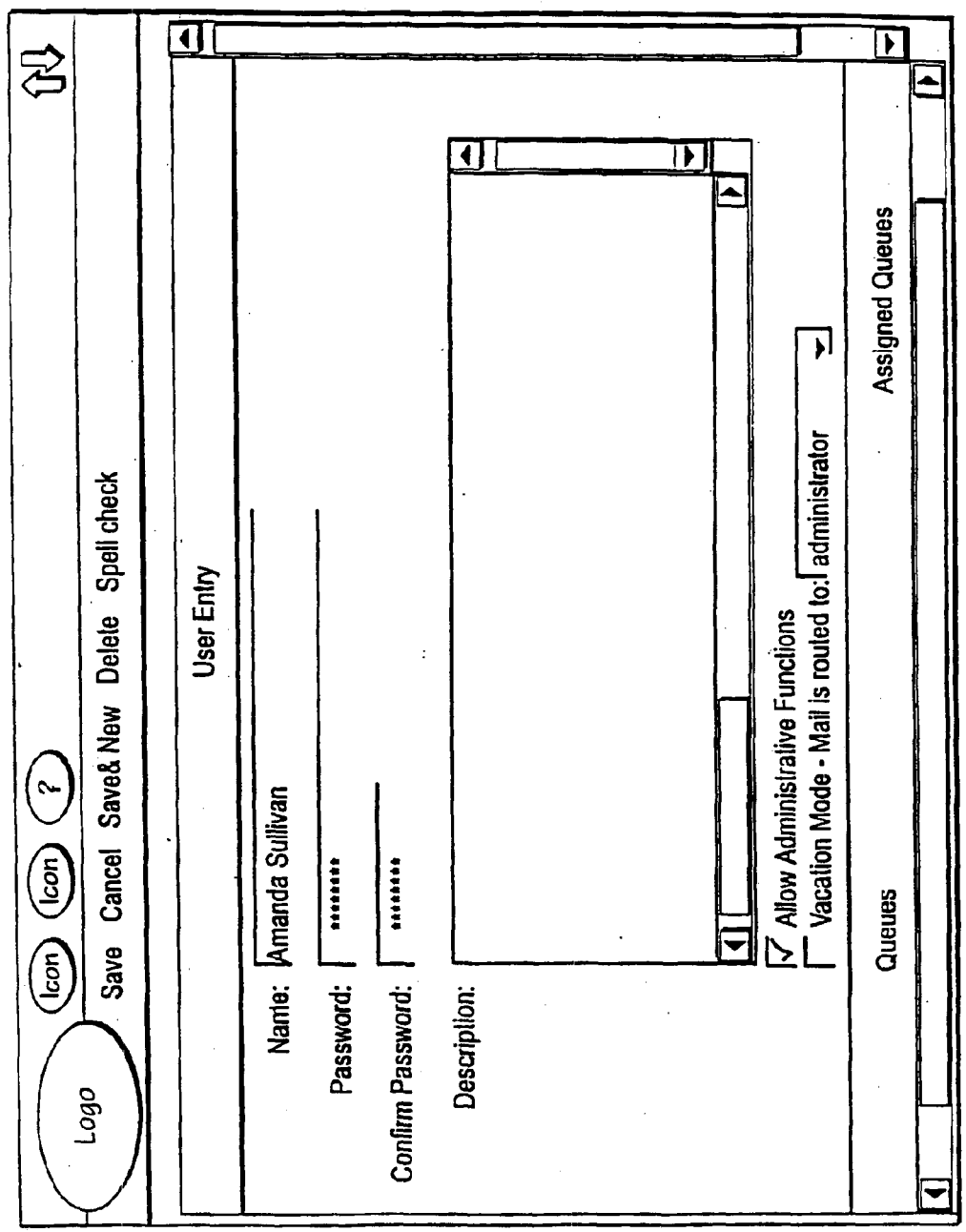
FIG. 5 illustrates one embodiment of a graphical user interface for entering and modifying enterprise email system user parameters.

To simplify the task of creating users, the enterprise email system 100 provides a graphical user interface for entering and modifying user parameters. FIG. 5 illustrates one possible embodiment of a graphical user interface for entering and modifying user parameters.

Before a user at a console (for this example we will refer to console 171 in FIG. 1) begins using the enterprise email system 100, the user must log into the enterprise email system 100 from his/her workstation 171. The login procedure informs the enterprise email system 100 that a new active user is available. The enterprise email system 100 responds to the new user login by sending a batch of messages from queues to which the new user subscribes into the user's mail box (for this example we will refer to mailbox 161).

The enterprise email system 100 has an idle user log-out feature. The idle user log-out feature automatically logs out a user that has been inactive for a configurable time period. By automatically logging out an inactive user, the incoming email messages in that user's mailbox are returned to the queue from which they came.

Figure 6:
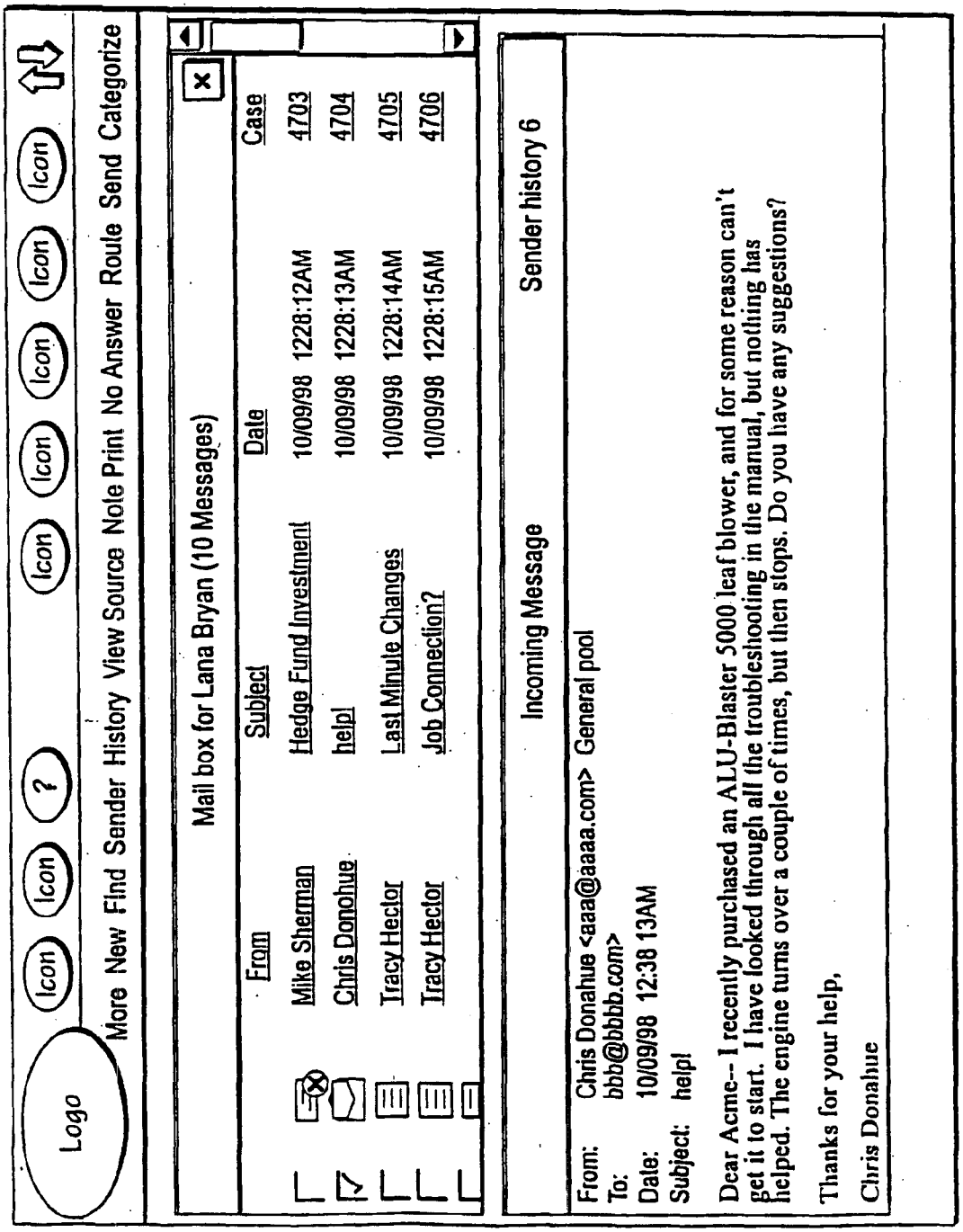
FIG. 6 illustrates the main enterprise email user display screen.

The enterprise email system 100 then generates a main display screen on the user's console 171 that displays some of the email in the user's mailbox. FIG. 6 illustrates one possible embodiment of a main display screen. The main display screen lists a few of the messages that have been placed into the user's mailbox. (The user may have other email messages in his mailbox that are not currently displayed on the screen.) One of the messages that is currently selected is displayed at the bottom of the screen.

In the main user display screen of FIG. 6, a number of actions are listed above the list of email messages. The enterprise email user uses the listed actions for processing messages. The available user actions for the embodiment of FIG. 6 are listed in the following table along with the action that will be performed if the action is selected:

| Action button | Action performed |
|---|---|
| More | Fetch more messages from a queue into the user's mailbox. |
| New | Create a new outgoing message. |
| Find | Allows the user to find messages in the email database 130. |
| Sender History | Obtain a history of all messages sent from this sender. |
| View Source | Examine the full raw SMTP message. |
| Note | Attach a note to this message. |
| Print | Print the message. |

-continued

| Action button | Action performed |
|---|---|
| NoAnswer | Remove the message from the mailbox without responding. (The message remains in the email database 130.) |
| Route | Route the message to another user or queue. |
| Send | Send the created response message to the original message sender. |
| Categorize | Add a category to the incoming email message. (This is analogous to the mail receiver adding a category to an incoming email message) |
| <message sender or subject> | Create a response message to be sent to the user. |

Again, many of the actions are the same actions that are in the mail receiver 120 rule set and the category entries. However, some of the actions not yet described will be presented in greater detail.

The "find" command allows the enterprise email user to search the email database 130 using a structured query. For example, an enterprise email user may find messages from a certain person, messages containing a particular word or phrase, messages associated with a case, messages in the same category, messages answered by the enterprise mail user, or unanswered messages anywhere or in a particular queue. The related command "Sender History" provides the enterprise email system user with a list of messages sent from the same sender. In this manner the enterprise email user may obtain some background on the user's earlier problems.

The "note" command allows an enterprise email user to attach a note to a particular message. The note will be placed into the email database 130 such that other enterprise email users that subsequently view the message will see the note.

The route command allows a user to route a message to another email user or another queue. As noted in the earlier sections, sending an email message to another user will not stop the queue timer value for the message. However, when a message is routed to a different queue, the original queue timer value is cleared and a new queue timer value is created for the message in the new queue. Routing to either another email user or another queue will clear the mailbox timer value since the message no longer exists in the user's mailbox.

To create a response message, the user simply selects the sender's name or the message's subject. In response to selecting the sender's name or the message's subject, the enterprise email system will display a response message screen as illustrate in FIG. 7. The response message may be filled in with a "skeleton" message that was created by the incoming mail receiver 120.

Figure 7:
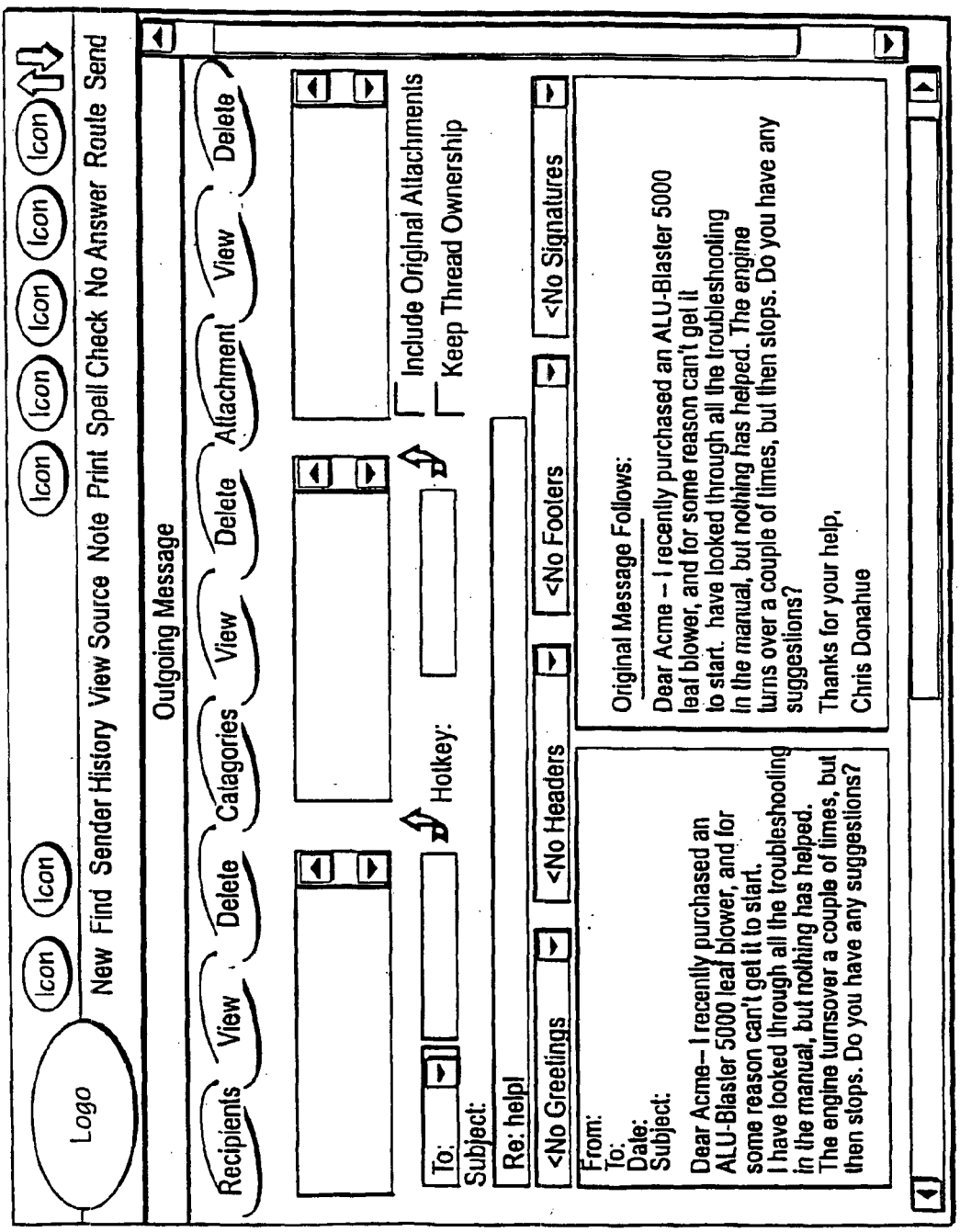
FIG. 7 illustrates a dialog box for entering an address of a recipient when routing, collaborating, forward & tracking, or redirecting a message.

Referring to the top of FIG. 7, the user can select and add recipients for the response message, add categories to the incoming message, and add attachments to the response message being created. Furthermore, the user may enter a subject title for the response message.

FIG. 7 illustrates a list of four "standard phrase" selectors below the subject field. The standard phrases allow the enterprise email user to quickly enter standard phrases that are placed into email messages. Each standard phrase consists of a string that may include fields from the email database 130 such as <recipient> that designates the recipient's name. In one embodiment, there are four standard phrase fields: Greetings, Body Headers, Body Footers, and Signatures. Greeting consists of introductory salutations such as "Dear <recipient>" or "Hello." Body Headers provide an introductory sentence "Thank you for your interest in our company." Body Footers provide a closing sentence such as "If we can be of further assistance, don't hesitate to write." Signatures provide a standard signature to be used such as "Sincerely, Your Customer Service Representative." Each user can maintain his/her own set of individual standard phrases such that the proper standard phrase can be selected from the list. Furthermore, the user can designate a default standard phrase to be used if no standard phrase is selected. The default may be <No Greeting> as illustrated in FIG. 7 which specifies that no standard phase should be used for that body element.

Finally, the bottom of FIG. 7 illustrates the incoming email message and the response message that is being created. To send a message, the enterprise email user selects the "send" command.

Figure 8:
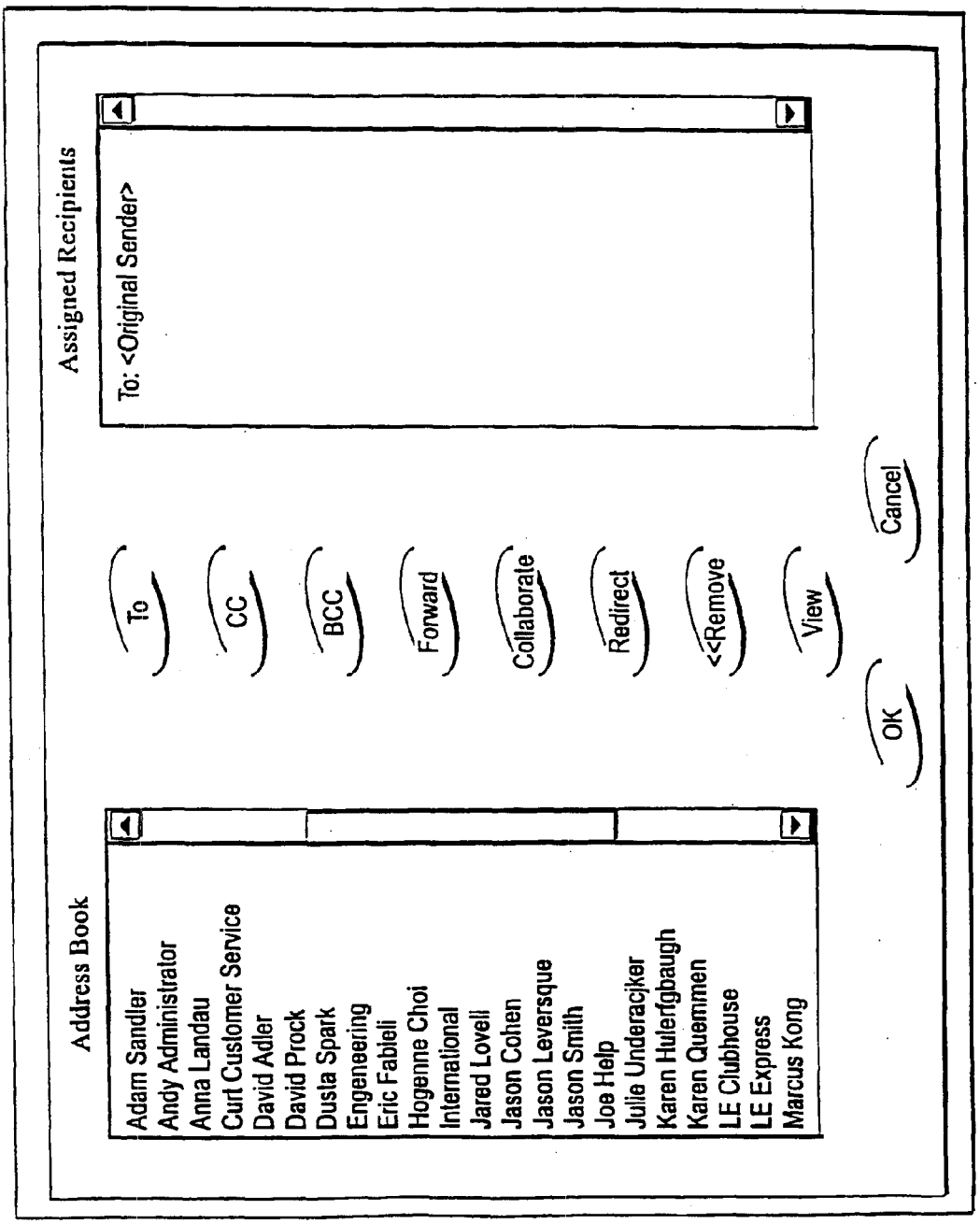
FIG. 8 illustrates a graphical user interface for creating a response message for an incoming message.

To forward and track a message to an outside user so that the outside user handle the message, the user creates a response message and then opens up the recipient dialog box. A number of recipients will be displayed as illustrated in FIG. 8. The user selects an outside person (a person that does not use the enterprise mail system) from the address list and then selects the "Forward" button. When the outside user responds to the message, the response will be received by the enterprise email system 100 such that the response message will be placed into the email database 130. The enterprise email system 100 then passes the response message created by the outside user to the original message sender.

Figure 9:
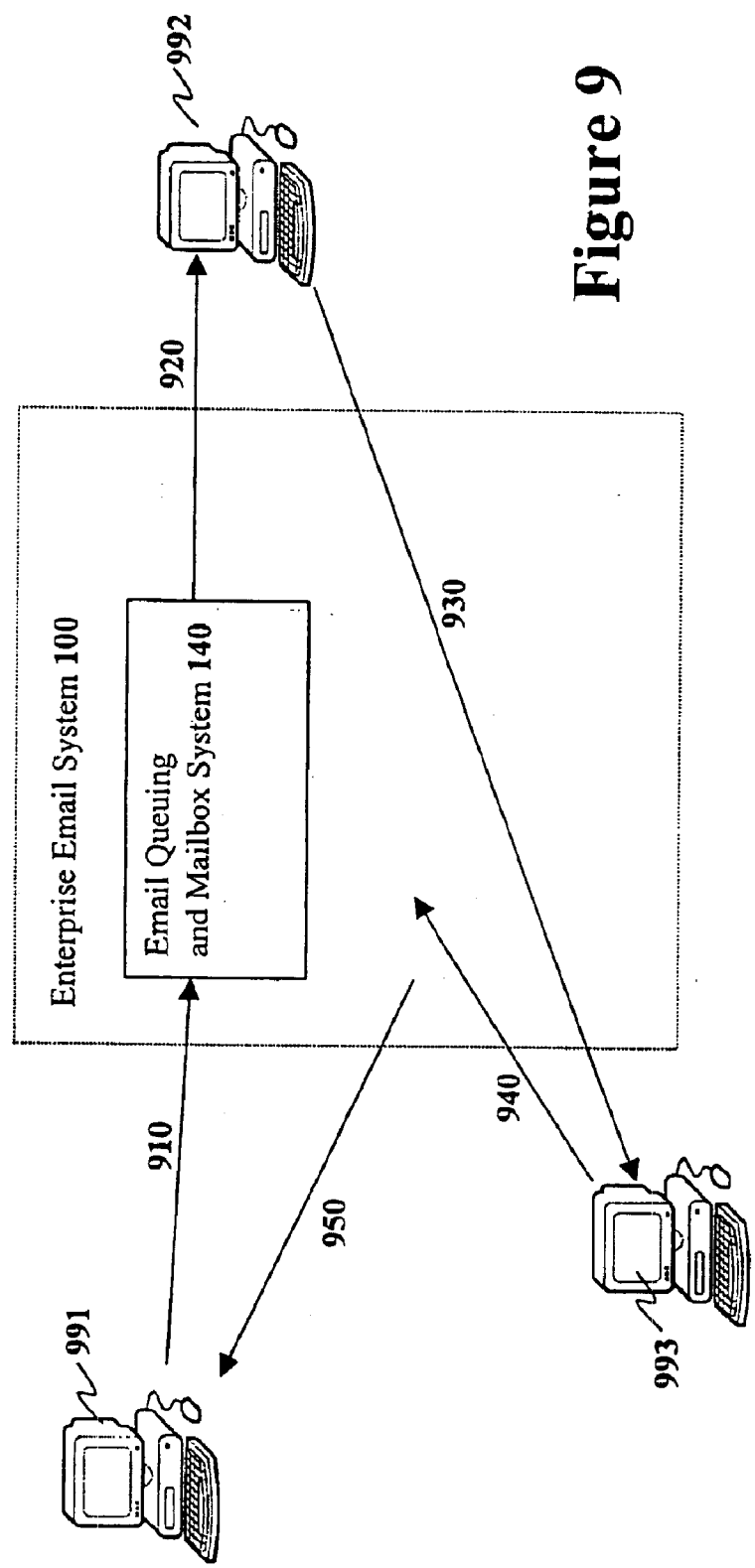
FIG. 9 illustrates a conceptual diagram that defines how the forward and track feature operates.

FIG. 9 illustrates in detail how the forward and track system operates. First, a customer 991 sends a message that is placed into the queuing system 140 of the enterprise email system 100 in step 910. At step 920, the incoming email message is eventually passed to the enterprise email user 992. The enterprise email user 992 passes the message on to outside consultant 993 using the forward and track feature at step 930. The consultant 993 drafts a reply and the reply is sent back to the enterprise email system 100 at step 940. The enterprise email system 100 stores the response in the email database 130 and passes the response to the customer 991 at step 950.

Figure 10:
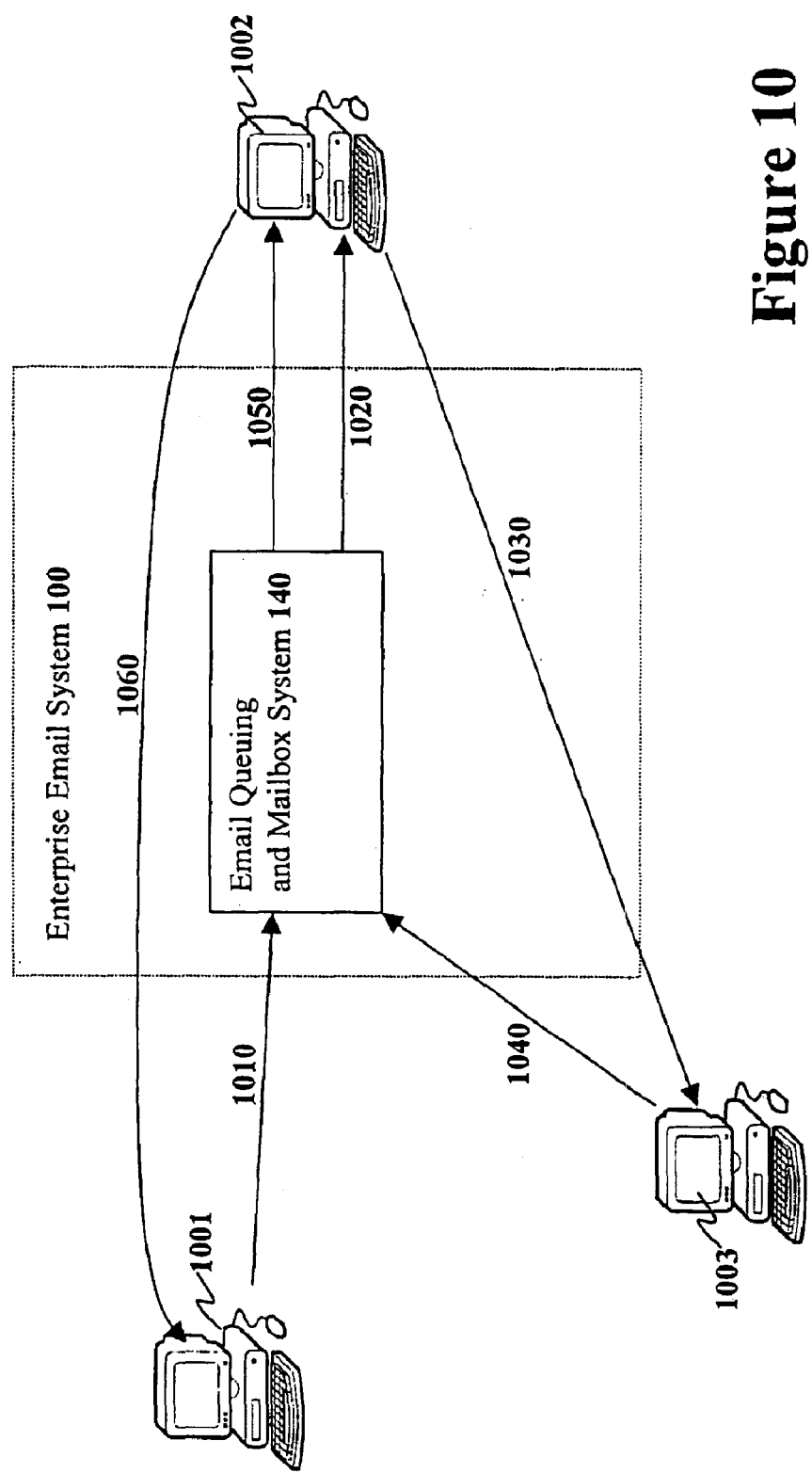
FIG. 10 illustrates a conceptual diagram that defines how the collaborate feature operates.

To collaborate on a message with an outside user, the user creates a response message but then opens up the recipient dialog box. A number of recipients will be displayed as illustrated in FIG. 8. The user selects a person from the address list and then selects the "Collaborate" button. When the collaborator responds, the collaborator's proposed response will be send back to this user. FIG. 10 illustrates in detail how the forward and track system operates.

First, a customer 1001 sends a message that is placed into the queuing system 140 of the enterprise email system 100 in step 1010. At step 1020, the incoming email message is eventually passed to the enterprise email user 1002. The enterprise email user 1002 passes the message on to outside consultant 1003 using the collaborate feature at step 1030. The consultant 1003 drafts a proposed response and the proposed response is sent back to the enterprise email system 100 at step 1040. The enterprise email system 100 stores the proposed response in the email database 130 and places the proposed response into the mailbox of enterprise email user 1002. Eventually, the enterprise email user 1002 retrieves and reviews the proposed response at step 1050. If the enterprise email user 1002 approves of the proposed response, the proposed response is sent to the customer 1001 at step 1060. Alternatively, the enterprise email user 1002 may further edit the response before sending it to the customer.

To redirect a message to an outside user to have the outside user handle the message, the user creates a response message but then opens up the recipient dialog box and redirects the message to the user as set forth above and illustrated in FIG. 8. Note that a redirected message maintains the original headers so the outside user can respond directly to the original sender. A redirected message is no longer tracked by the enterprise email system 100.

The foregoing has described an enterprise email management system. It is contemplated that changes and modifications may be made by one of ordinary skill in the art, to the materials and arrangements of elements of the present invention without departing from the scope of the invention.

We claim:

1. A computer implemented method for processing electronic messages, said method comprising:

receiving a first message into an enterprise mail system, said first message from a first human message sender;

storing said first message in a message database;

assigning a category entry from a category database to said first message, said category entry containing information for handling particular incoming messages;

delivering said first message to a first enterprise mail system user; and providing a template response message to said first enterprise mail system user using information in said category entry, said template response message including a set of message recipients defined in said category entry.

2. The method of claim 1 wherein assigning a category entry from a category database to said first message is performed by a rule processor.

3. The method of claim 1 wherein assigning a category entry from a category database to said first message is performed by said first enterprise and system user.

4. The method of claim 1 wherein providing a template response message further comprises:

providing a set of default message body sections for said template response message.

5. The method of claim 4 wherein one of said set of default message body sections comprises a salutation.

6. The method of claim 4 wherein one of said set of default message body sections comprises a body header.

7. The method of claim 4 wherein one of said set of default message body sections comprises a closing.

8. The method of claim 4 wherein one of said set of default message body sections comprises a footer.

9. The method of claim 1 wherein said message database comprises a relational database.

10. The method of claim 1 wherein one of said set of message recipients comprises said human message sender.

11. A method for processing electronic messages, the method comprising:

receiving an electronic mail message;

analyzing the contents of the received electronic mail message;

responsive to the analysis of the contents of the message, associating the electronic mail message with a message category; and automatically generating a skeleton response message to at least on recipient, wherein the recipients are selected responsive to associating the electronic mail message with the message category.

12. The method of claim 11 wherein the analysis of the contents of the received electronic mail message is performed automatically.

13. The method of claim 11 wherein the analysis of the contents of the received electronic mail message is performed manually.

14. An electronic mail processing system comprising:

receiving means for receiving an electronic mail message;

analyzing means, coupled to the receiving means, for analyzing the contents of the received electronic mail message;

associating means, coupled to the analyzing means, for associating the electronic mail message with a message category responsive to the analysis of the contents of the message; and generating means, coupled to the analyzing means, automatically generating a skeleton response message to at least one recipient, wherein the recipients are selected responsive to associating the electronic mail message with the message category.

15. A computer program product stored on a computer readable medium and containing instructions to control a computer processor to execute the steps of:

receiving an electronic mail message;

analyzing the contents of the received electronic mail message;

responsive to the analysis of the contents of the message, associating the electronic mail message with a message category; and automatically generating a skeleton response message to at least one recipient, wherein the recipients are selected responsive to associating the electronic mail message with the message category.

* * * * *

UNITED STATES PATENT AND TRADEMARK OFFICE
CERTIFICATE OF CORRECTION

PATENT NO.    : 6,941,304 B2
DATED         : September 6, 2005
INVENTOR(S)   : Gainey et al.

It is certified that error appears in the above-identified patent and that said Letters Patent is hereby corrected as shown below:

Column 17,
Line 1, after "electronic" add -- mail --.
Line 10, change "on" to -- one --.

Signed and Sealed this

Twenty-second Day of November, 2005

JON W. DUDAS
*Director of the United States Patent and Trademark Office*